United States Patent [19]
Andreani et al.

[11] Patent Number: 5,873,929
[45] Date of Patent: Feb. 23, 1999

[54] GAS TREATMENT BOTTLE

[75] Inventors: Philippe Andreani, Le Kremlin Bicetre; Christian Monereau, Paris; Michel Poteau, Dammartin en Goele, all of France

[73] Assignee: L'Air Liquide, Societe Anonyme Pour L'Etude et L'Exploitation des Procedes Georges Claude, Paris Cedex, France

[21] Appl. No.: 886,460

[22] Filed: Jul. 1, 1997

[30]     Foreign Application Priority Data

Jul. 2, 1996  [FR]  France .................................... 96 08231

[51] Int. Cl.⁶ .................................................... B01D 53/04
[52] U.S. Cl. ................................ 96/108; 96/152; 422/177
[58] Field of Search ........................ 95/130, 138; 96/108, 96/130–133, 139–141, 144, 152; 422/177

[56]              References Cited

U.S. PATENT DOCUMENTS

| | | | |
|---|---|---|---|
| 1,849,196 | 3/1932 | Meurk et al. | 96/139 X |
| 2,435,781 | 2/1948 | Heydorn | 96/139 |
| 2,620,892 | 12/1952 | Stover | 96/152 X |
| 2,678,108 | 5/1954 | Reid | 96/133 |
| 2,884,372 | 4/1959 | Bergstrom | 208/113 |
| 3,227,527 | 1/1966 | Heinze et al. | 23/288 |
| 3,498,755 | 3/1970 | Borre | 23/288 |
| 4,127,395 | 11/1978 | McKey et al. | 96/130 X |
| 4,197,095 | 4/1980 | White, Jr. et al. | 96/130 X |
| 4,312,640 | 1/1982 | Verrando | 96/130 X |
| 4,750,999 | 6/1988 | Roberts et al. | 96/152 X |
| 5,160,513 | 11/1992 | Koves | 96/139 X |
| 5,298,226 | 3/1994 | Nowobilski | 422/177 X |
| 5,538,544 | 7/1996 | Nowobilski et al. | 96/139 X |
| 5,593,475 | 1/1997 | Minh | 96/130 X |
| 5,632,807 | 5/1997 | Tomita et al. | 96/133 X |
| 5,716,427 | 2/1998 | Andreani et al. | 96/130 X |

FOREIGN PATENT DOCUMENTS

| | | |
|---|---|---|
| 2 166 004 | 6/1996 | Canada . |
| 0 080 125 | 6/1983 | European Pat. Off. . |
| 0 596 255 | 5/1994 | European Pat. Off. . |
| 1100660 | 3/1961 | Germany .............................. 96/144 |
| 2844770 | 4/1980 | Germany .............................. 96/139 |
| 0270013 | 7/1989 | Germany .............................. 96/139 |
| 60-137431 | 7/1985 | Japan ..................................... 96/131 |
| 61-178018 | 8/1986 | Japan ..................................... 96/152 |
| 1171074 | 8/1985 | U.S.S.R. ................................ 96/108 |
| 1780814 | 12/1992 | U.S.S.R. ................................ 96/144 |
| 1813525 | 5/1993 | U.S.S.R. ................................ 96/108 |

*Primary Examiner*—Robert Spitzer
*Attorney, Agent, or Firm*—Young & Thompson

[57]                 ABSTRACT

A gas treatment bottle comprises at least one gas dispenser (24;50) and has a distributor (25;51) intended to be fixed in a gas treatment bottle (10) in front of an inlet or outlet orifice (18;56). The distributor (25;51) has a head (26) which covers the orifice and has an openworked end wall (28) and an openworked side wall (30), typically inclined in the direction of the end wall (28) and surrounding it. The degree of openworking in the side wall (30) is greater than the degree of openworking in the end wall (28).

13 Claims, 2 Drawing Sheets

GAS TREATMENT BOTTLE

FIELD OF THE INVENTION

The present invention relates to a gas treatment bottle, having a casing, containing at least one bed of particulate material and, in front of at least one gas passage orifice, a gas distributor having an openworked head covering the orifice.

BACKGROUND OF THE INVENTION

Bottles of this type contain, for example, adsorbent materials, in particular for separating nitrogen from air.

In bottles with vertical axial circulation, two orifices, for inlet or outlet, are arranged respectively in the lower part and in the upper part of the bottle. Depending on the period of the operating cycle of the installation, the lower or upper orifice lets gas into the bottle, whereas the opposite orifice lets it out.

The orifices are arranged along the axis of the bottle. Thus, the gas emerging from the inlet orifice should be distributed over the entire cross-section of the bottle in order to optimize the efficiency of the installation. The gas dispenser arranged in the bottle at the outlet of the orifice has the purpose of allowing a uniform distribution of the gas over this entire cross-section.

SUMMARY OF THE INVENTION

The object of the present invention is to provide a treatment bottle incorporating a gas dispenser which is simple, robust, inexpensive and ensures high-quality distribution.

To this end, according to one aspect of the invention, the head extends into an internal space between the casing and the bed, at a distance from the latter, and has an openworked end wall on the opposite side from the orifice and an openworked side wall, the degree of openworking in the side wall being greater than the degree of openworking in the end wall.

The invention also relates to the use of a gas treatment bottle of this type, for separating nitrogen from air.

BRIEF DESCRIPTION OF THE DRAWINGS

The invention will be understood more clearly on reading the following description, given solely by way of example and made with reference to the drawings, in which.

DETAILED DESCRIPTION OF THE INVENTION

Figure 1:
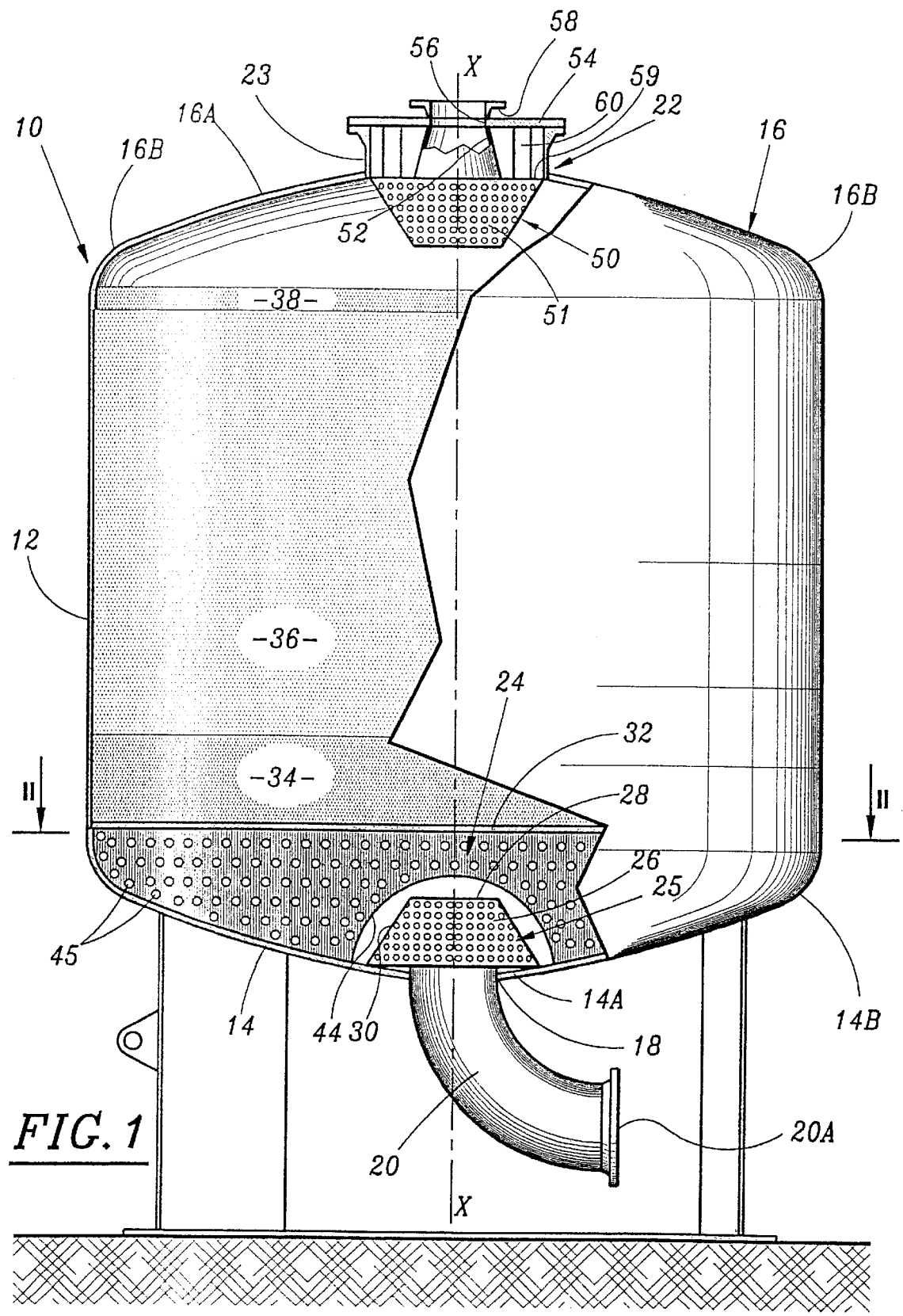
FIG. 1 is a view in longitudinal section of an adsorption bottle according to the invention.
Figure 2:
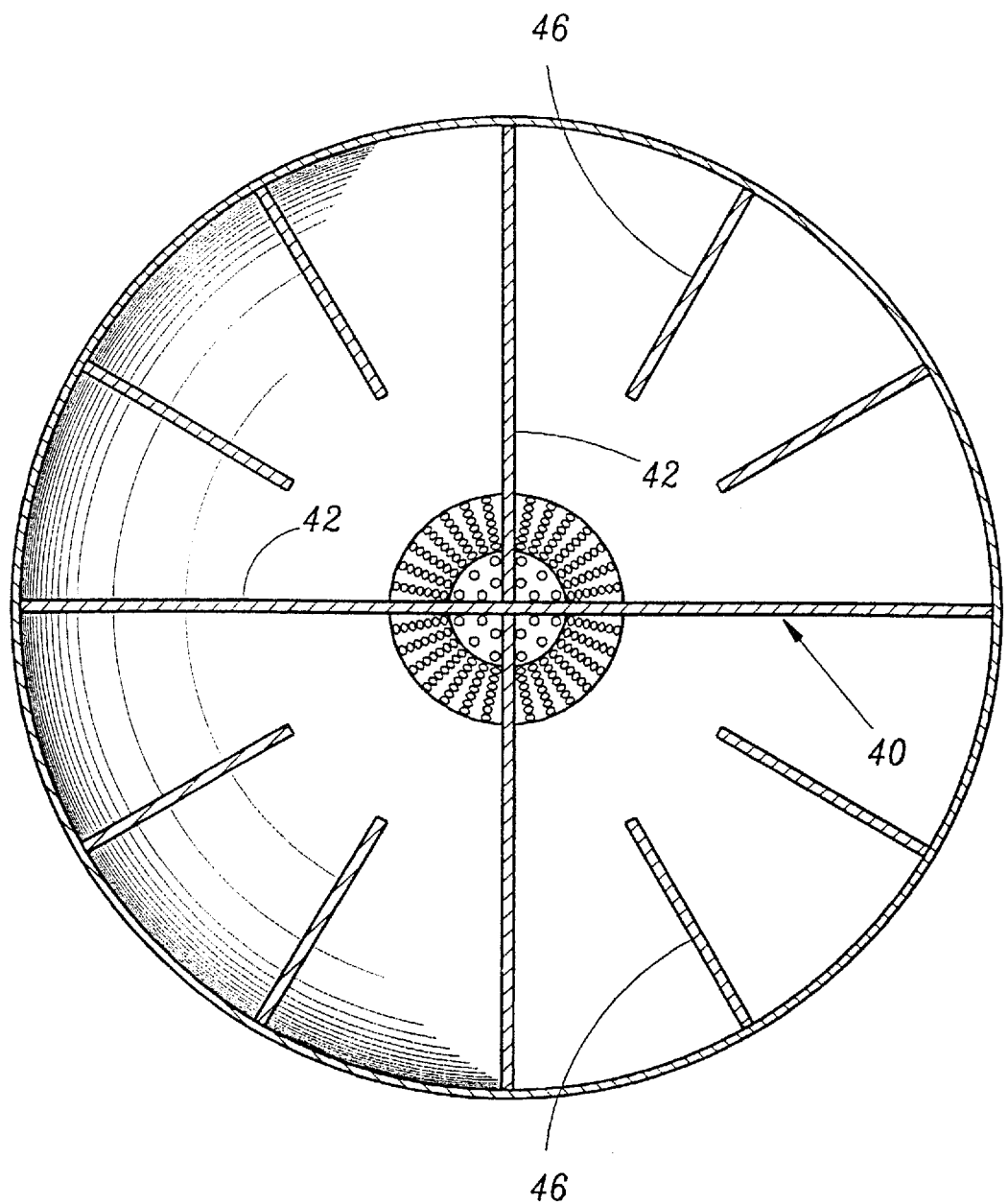
FIG. 2 is a cross-sectional top view of the bottle in FIG. 1, taken along the line II—II.

In the embodiment represented in FIG. 1, the adsorption bottle 10 has vertical axial circulation. It is intended for treating air and, in particular, for separating nitrogen and oxygen from air by pressure swing adsorption (PSA). The bottle has a cylindrical side wall 12 of axis X—X, a domed bottom 14 and an upper wall 16 which is also domed. The central parts of the bottom 14 and the upper wall 16 are in the shape of a spherical cap having large radius, and are respectively denoted 14A, 16A. At its periphery, each cap is extended by a toroidal ring 14B, 16B which has a smaller radius of curvature than the spherical cap 14A and 16A and on which the side wall 12 is welded tangentially.

An orifice 18 is arranged at the centre of the bottom 14 along the axis X—X of the bottle. This orifice is extended externally by a bend 20 fitted with a flange 20A for fastening a pipe feeding the gas mixture (air) to be separated. The bend 20 is welded directly on the spherical cap 14A.

The upper wall 16 also has an orifice 22 formed along the axis X—X. A flange 23 is welded on the outside of the wall 16 level with this orifice 22. It forms a manhole allowing access to the interior of the bottle 10.

A gas dispenser 24 is fixed in the bottle 10 at the outlet of the orifice 18. It has a distributor 25 formed by a head 26 covering the orifice. In the example which is represented, this head has, on the one hand, a substantially plane transverse end diffusion wall 28 arranged orthogonal to the axis of the orifice 18 and, on the other hand, a side diffusion wall 30 of frustoconical shape converging in the direction of the end wall 28. The side wall 30 is welded on the bottom 14 along its larger-diameter circumference. The head 26 extends into the free space between the bottom 14 and the adsorbent bed in the bottle, so that the end wall is substantially half way between the adsorbent and the bottom.

In the example which is represented, the end wall 28 has a diameter of 300 mm. The side wall 30 is defined by a frustum of a cone whose vertex angle is equal to 60°. The diameter of this cone frustum decreases progressively from the orifice 18 in the direction of the end wall 28, from a diameter of 500 mm to the diameter of 300 mm of the end surface. Thus, the surface area of the end wall 28 is substantially equal to one fifth of the side wall 30. In practice, the end wall is dimensioned in such a way that its surface area is between one half and one eighth of the surface area of the side wall. The walls 28 and 30 are apertured or openworked. They are, for example, perforated with a set of holes, these advantageously being distributed uniformly.

In order to ensure that the gas is distributed properly, the degree of openworking in the side wall 30 is greater than the degree of openworking in the end wall 28. The degree of openworking, also referred to as void ratio, is defined by the ratio of the openworked surface area of the wall to its total surface area.

The degree of openworking in the side wall is, for example, between twice and four times the degree of openworking in the end wall, and is in particular substantially equal to three times. The degree of openworking in the end wall is substantially equal to 8%, whereas the degree of openworking in the side wall is substantially equal to 23%.

The gas dispenser 24 typically has a bed support grid 32 arranged above the distributor 25, at a distance from it, level with the junction between the bottom 14 and the side wall 12. In the example which is represented, the grid 32 supports a first bed 34, formed by alumina or ceramic balls, increasing the uniformity of the gas diffusion into a second bed, or main bed, 36, intended for treating the gas. The bed 36, formed by adsorbent particulate materials, extends essentially over the height of the bottle and is covered with an upper bed 38 of ceramic balls. This upper bed ensures cohesion of the bed of adsorbent materials when the gas circulates, since the ceramic balls are denser than the adsorbent material.

The grid 32 is supported by a set of radial gussets 40. These gussets are centered on the distributor 25 and bear on the bottom 14. By way of example, they have two main plates 42, arranged perpendicular to one another and extending along diameters of the bottle. These plates have two curved notches 44 for passage of the distributor 25. In addition, the plates 42 are provided with holes 45 intended to balance pressures between the four quadrants which they define.

Additional gussets 46 are arranged radially between the bottom 14 and the grid 32. They are formed by pierced plates extending parallel to the outlet axis of the orifice 18. These plates extend from the outer periphery of the bottle to substantially halfway along its radius. They thus end before they reach the distributor 25.

The upper orifice 22 is also provided with a gas dispenser 50, having a distributor 51 with openworked frustoconical head identical to the distributor 25 and extending in the free space between the top end wall 16A and the upper bed 38.

The distributor 51 is connected, via a divergence 52, to a plug 54 for closing the manhole. An orifice 56, fitted with a flange 58 for fastening a pipe of the installation, passes through the plug 54. The diameter of the divergence 52 thus increases progressively from the orifice 56 to the dispenser 51. An axially pierced annular plate 59 connects the outlet of the divergence to the side wall of the distributor level with its larger-diameter periphery. In addition, connecting struts 60 are provided between the plug 54 and the plate 59.

The external diameter of the distributor 51 is substantially less than the internal diameter of the manhole defined by the flange 23. Thus, the distributor 51 fixed on the plug 54 is fitted at the same time as the latter after the bottle has been filled. The bed 38 of ceramic balls extends below the distributor 51, so that it may be necessary to interpose an inflatable balloon between the upper bed and the distributor when the bottle is being transported, in order to prevent any shifting of the superposed beds.

It will be understood that, with dispensers of this type, essentially all of the gas emerging from the feed orifice is distributed radially. Only a small proportion of the gas circulates substantially along the outlet axis. The gas is thus distributed over the entire cross-section of the bottle, thus ensuring optimal use of the bed of adsorbent materials.

In addition when feeding takes place from below (in the production phase), the gussets which extend radially do not interfere with the distribution of the gas over the entire cross-section of the bottle. The perforations formed through these gussets balance the pressures between the various sectors which they define, in spite of a gas feed which may be slightly asymmetric, in particular because of the presence of the bend 20 at the inlet to the bottle.

When the gas is discharged from the bottle through one of the orifices, the gas is subjected to a suction effect. In a bottle as described here, this suction takes place uniformly over the entire cross-section of the bottle, by virtue of the dispenser arranged in front of the orifice. The dispenser which is described here thus ensures that the gas flows uniformly over the entire cross-section of the bottle both at the inlet to the bottle and at its outlet.

We claim:

1. Gas treatment bottle, having a casing including a bottom, and containing at least one bed of particulate material and, in front of at least one gas passage orifice, a gas distributor having an openworked head covering the orifice, wherein the head extends into an internal space between the casing and said at least one bed, at a distance from said at least one bed, and has an openworked end wall on a side opposite from the orifice and an openworked side wall, each of the openworked side wall and openworked end wall having a degree of openworking, and the degree of openworking in the side wall being greater than the degree of openworking in the end wall.

2. The bottle according to claim 1, wherein the orifice has an outlet axis, and the end wall extends substantially orthogonal to the outlet axis of the orifice.

3. The bottle according to claim 2, wherein the side wall is frustoconical.

4. The bottle according to claim 2, wherein the side wall has a vertex angle substantially equal to 60°.

5. The bottle according to claim 1, wherein the degree of openworking in the side wall ranges between twice and four times the degree of openworking in the end wall.

6. The bottle according to claim 1, wherein the degree of openworking in the side wall is substantially equal to three times the degree of openworking in the end wall.

7. The bottle according to claim 1, wherein the degree of openworking in the end wall is substantially equal to 8%.

8. The bottle according to claim 1, wherein the end wall and the side wall each have a surface area, and the surface area of the end wall is less than the surface area of the side wall.

9. The bottle according to claim 8, wherein the surface area of the end wall ranges between one half and one eighth of the surface area of the side wall.

10. The bottle according to claim 8, wherein the surface area of the end wall is substantially equal to one fifth the surface area of the side wall.

11. The bottle according to claim 1, further comprising a grid which is intended to support said at least one bed, and is itself supported by a set of radial gussets centered on a distributor.

12. The bottle according to claim 11, wherein the gussets have perforated plates which extend substantially parallel to an outlet axis of the orifice, and are intended to bear on the bottom of the bottle.

13. The bottle according to claim 11, wherein at least some of the gussets extend from an outer periphery of the bottle to a point away from the distributor.

\* \* \* \* \*